United States Patent [19]

Buhmann et al.

[11] 4,318,783

[45] Mar. 9, 1982

[54] PROCESS FOR THE PREPARATION OF OPTIONALLY SUBSTITUTED BENZALDEHYDE DIALKYL ACETALS

[75] Inventors: Hans-Rolf Buhmann, Langenfeld; Dieter Arlt, Cologne; Manfred Jautelat, Burscheid, all of Fed. Rep. of Germany

[73] Assignee: Bayer Aktiengesellschaft, Leverkusen, Fed. Rep. of Germany

[21] Appl. No.: 94,132

[22] Filed: Nov. 14, 1979

[30] Foreign Application Priority Data

Nov. 30, 1978 [DE] Fed. Rep. of Germany ....... 2851732
Jun. 9, 1979 [DE] Fed. Rep. of Germany ....... 2923531
Jul. 27, 1979 [DE] Fed. Rep. of Germany ....... 2930480

[51] Int. Cl.$^3$ .............................................. C25B 3/02
[52] U.S. Cl. ..................................... 204/59 R; 204/79
[58] Field of Search .......................... 204/59 R, 78, 79

[56] References Cited

U.S. PATENT DOCUMENTS 3,257,298  6/1966  Hughes ................................. 204/78
3,664,936  5/1972  Seko et al. ......................... 204/73 A
4,203,811  5/1980  Cramer ................................. 204/78

FOREIGN PATENT DOCUMENTS 2460754  7/1976  Fed. Rep. of Germany ........ 204/78
2547383  4/1977  Fed. Rep. of Germany ........ 204/78
2547463  4/1977  Fed. Rep. of Germany ........ 204/78

Primary Examiner—F. Edmundson
Attorney, Agent, or Firm—Sprung, Felfe, Horn, Lynch & Kramer

[57] ABSTRACT

An electrochemical oxidation process of optionally substituted toluene dissolved in an alcohol in the presence of a conducting salt is described wherein the electrochemical oxidation is carried out at a current density of 0.1 to 50 A/dm$^2$ using oxidation-resistant anodes. According to the disclosure, the reaction product can be distillatively worked up to obtain secondary products which can be recycled to electrochemical oxidation optionally after treatment of at least some of the secondary products with hydrogen in the presence of a catalyst.

11 Claims, No Drawings

PROCESS FOR THE PREPARATION OF OPTIONALLY SUBSTITUTED BENZALDEHYDE DIALKYL ACETALS

The invention relates to a process for the preparation of optionally substituted benzaldehyde dialkyl acetals.

It is known to oxidize p-methoxy toluene with inorganic oxidation agents such as permanganate or dichromate to give anisaldehyde (Ullmanns Enzyklopädie der technischen Chemie (Ullmann's Encyclopaedia of Industrial Chemistry), 3rd edition, vol. 14, pg. 738, Urban und Schwarzenberg Publishers, Munich/Berlin 1963).

This process has some disadvantages: partial further oxidation to give anisic acid can be expected, and owing to the inevitable occurrence of aqueous metal salt solutions the process adversely affects the environment.

It is known to electochemically oxidize toluene in methylene chloride as solvent and in the presence of methanol, a conducting salt and sulphuric acid to produce anisaldehyde in an amount of 20% of the theoretical yield (Tetrahedron Letters 1978, pg. 3723).

It is known furthermore to electrochemically oxidize p-methoxy toluene in methanol as solvent and in the presence of sodium methylate to produce anisaldehyde dimethyl acetal (J. Chem. Soc., Perkin Transact. I, 1978, pg. 708). In this method of procedure methoxylation is observed both in the side-chain and in the aromatic nucleus of the starting material (ibid. pg. 709).

Furthermore the electrochemical oxidation of hydroquinone dimethyl ether in methanol as solvent and in the presence of potassium hydroxide to produce benzoquinone tetramethyl ketal is known (J. Am. Chem. Soc. 85, 2525 (1963)) in which methylation in the aromatic nucleus of the hydroquinone dimethyl ether is also observed.

A process has been found for the preparation of optionally substituted benzaldehyde dialkyl acetals which is characterized in that optionally substituted toluenes of the formula

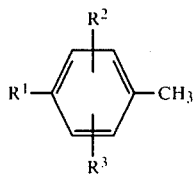

(I)

in which
$R^1$ denotes hydrogen, alkyl, aryl, aralkyl, alkoxy, aryloxy or aralkoxy and
$R^2$ and $R^3$ are identical or different and represent hydrogen, alkyl, aryl or aralkyl,
dissolved in an alcohol of the formula

 (II)

in which
$R^4$ denotes alkyl, and in the presence of a conducting salt of the formula

 (III)

in which
Y denotes an alkali metal, non-substituted ammonium or ammonium partially or totally substituted by alkyl or benzyl, A represents

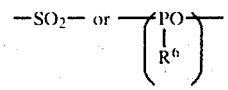

$R^5$ represents alkyl, aralkyl, aryl, alkoxy, aralkoxy, aryloxy, hydroxy or OY and
$R^6$ represents alkoxy, aralkoxy, aryloxy, hydroxyl or OY, are oxidized electrochemically at a current density of 0.1 to 50 A/dm$^2$ and the secondary products formed are reintroduced into the starting material for the electro chemical oxidation, the secondary products optionally being treated with catalytically activated hydrogen prior to the reintroduction.

Example of alkyl which may be mentioned are straight-chained or branched hydrocarbon radicals with 1 to 4 carbon atoms, such as methyl, ethyl, propyl, isopropyl, butyl or isobutyl. The preferred alkyl is methyl.

Examples of aryl which may be mentioned are aromatic hydrocarbon radicals with 6 to 14 carbon atoms, such as phenyl, naphthyl or anthryl. The preferred aryl is phenyl.

Examples of aralkyl which may be mentioned are hydrocarbon radicals with 1 to 2 carbon atoms in the aliphatic part and 6 to 14 carbon atoms in the aromatic part, such as benzyl, 2-phenylethyl, naphthylmethyl, 2-naphthylethyl, anthrylmethyl or 2-anthrylethyl. The preferred aralkyl is benzyl.

For alkoxy radicals may be mentioned which are derived from a straight-chained or branched alcohol with 1 to 4 carbon atoms, such as methoxy, propoxy, isopropyloxy, butoxy or isobutyloxy. The preferred alkoxy is methoxy, butoxy or isobutyloxy. The preferred alkoxy is methoxy.

Examples of aryloxy which may be mentioned are radicals which are derived from an aromatic hydroxy compound with 6 to 14 carbon atoms, such as phenoxy, naphthyloxy or anthryloxy. The preferred aryloxy is phenoxy.

Examples of aralkoxy which may be mentioned are radicals which are derived from an araliphatic alcohols with 1 or 2 carbon atoms in the aliphatic part and 6 to 14 carbon atoms in the aromatic part, such as benzyloxy, 1-phenylethyloxy, 2-phenylethyloxy, naphthylmethoxy, naphthylethoxy, anthrylmethoxy or anthrylethoxy. The preferred aralkoxy is benzyloxy.

The named radicals, preferably the aromatic nuclei contained in these, can themselves be substituted by alkyl and/or halogen. Examples for the alkyl substituent which may be mentioned are methyl, ethyl, propyl, isopropyl, butyl or isobutyl, preferably methyl. Examples for the halogen substituent are fluorine, chlorine or bromine, preferably chlorine.

The following may for example be mentioned as optionally substituted toluenes which may be used in the process according to the invention: toluene, o-, m- and p-xylene, mesitylene, 1-methyl-4-ethyl benzene, 1-methyl-4-propyl benzene, 1-methyl-4-isopropyl benzene, 1-methyl-4-butyl benzene, 1-methyl-4-isobutyl benzene, 1,2-dimethyl-4-ethyl benzene, 2-methyl-, 3-methyl- and 4-methyl-diphenyl methane, 2-methyl-, 3-methyl- and 4-methyl-diphenyl, p-methoxy-roluene, p-ethoxy-toluene, p-propoxy toluenes, p-isopropyloxy toluene, p-butoxy toluene, p-isobutyloxy toluene, p-phenoxy toluene, p-benzyloxy toluene, 2-methyl-4- methoxy toluene, 3-methyl-4-methoxy toluene, 2,3-dimethyl-3-methoxy toluene, 2,5-dimethyl-4-methoxy toluene, 2,6-dimethyl-4-methoxy toluene, 2-phenyl-4-methoxy toluene, 3-phenyl-4-methoxy toluene, 2-benzyl-4-methoxy toluene, 3-benzyl-4-methoxy toluene, 2-phenyl-3-methyl-4-methoxy toluene, 2-methyl-3-phenyl-4-methoxy toluene, 2-ethyl-3-benzyl-4-phenoxy toluene, 2-benzyl-4-benzyloxy-5-isopropyl toluene, 2,6-dibutyl-4-benzyloxy toluene, 1-methyl-4-(t-butyl)benzene.

The following may be mentioned as examples of alcohols of formula (II): methanol, ethanol, propanol, isopropanol, butanol or isobutanol, preferably methanol.

The cation Y of the conducting salt, the cations in the case of multivalent acids, may for example be an alkali metal, non-substituted ammonium or an ammonium partially or completely substituted by alkyl or benzyl.

Lithium, sodium, potassium, rubidium or cesium may be mentioned as alkali metals. The preferred alkali metal is sodium or potassium.

The following may be mentioned as examples of ammonium partially or completely substituted by alkyl or benzyl: methyl ammonium, dimethyl ammonium, trimethyl ammonium, tetramethyl ammonium, ethyl ammonium, diethyl ammonium, triethyl ammonium, tetraethyl ammonium, dimethylethyl ammonium, tetrapropyl ammonium, butyl ammonium, dibutyl ammonium, tributyl ammonium, tetrabutyl ammonium, dimethylbutyl ammonium, dimethyldibutyl ammonium, benzyl ammonium, dibenzyl ammonium, dimethylbenzyl ammonium, diethylbenzyl ammonium, dibutylbenzyl ammonium, dimethyldibenzyl ammonium, diethyldibenzyl ammonium.

Preferred cations for the conducting salt (III) are the tetraalkyl ammonium cations.

The groun A of formula (III) may represent (

The conducting salt of the process according to the invention may thus be derived from an acid of hexavalent sulphur or pentavalent phosphorus.

Examples which may be mentioned of the acid derived from hexavalent sulphur are sulphuric acid, an alkyl, aralkyl or aryl sulphonic acid or a sulphuric acid monoester, the ester group being derived from an aliphatic or araliphatic alcohol or a phenol.

Accordingly conducting salts of the formula $$R^5\text{—}A'\text{—}OX \qquad (IV)$$

in which
R$^5$ and Y have the above-mentioned meaning and
A' represents —SO$_2$—
are included under formula (III).

Examples which may be mentioned of an anion, derived from an acid of hexavalent sulphur, for the conducting salt are: hydrogen sulphate, sulphate already neutralised by a cation of the named type, methyl sulphonate, ethyl sulphonate, propyl sulphonate, butyl sulphonate, benzyl sulphonate, benzene sulphonate, p-toluene sulphonate, o-chloro-p-toluene sulphonate, 2,4-dichlorobenzene sulphonate, 2-bromo-4-methylbenzene sulphonate, 1-naphthyl sulphonate 2-naphthyl sulphonate, methyl ester sulphate, ethyl ester sulphate, propyl ester sulphate, butyl ester sulphate, benzyl ester sulphate, phenyl ester sulphate, p-tolyl ester sulphate, p-chlorophenyl ester sulphate. Preferred anions of acids of hexavalent sulphur are methyl sulphonate, ethyl sulphonate, benzene sulphonate, p-toluene sulphonate, 2,4-xylene sulphonate, o-chlorobenzene sulphonate, m-chlorobenzene sulphonate, p-chlorobenzene sulphonate, 2,4-dichlorobenzene sulphonate, methyl ester sulphate, ethyl ester sulphate. Particularly preferred anions of acids of hexavalent sulphur are benzene sulphonate, p-toluene sulphonate, p-chlorobenzene sulphonate and methyl ester sulphate.

Examples which may be mentioned of the acid which is derived from pentavalent phosphorus are phosphoric acid, an lakyl, aralkyl or aryl phosphonic acid, a phosphoric acid monoester or diester, or a phosphonic acid monoester, the ester groups being derived from an aliphatic or araliphatic alcohol or from a phenol.

Accordingly conducting salts of the formula $$R^5\text{—}A''\text{—}OX \qquad (V)$$

in which
A" represents

and
R$^5$, R$^6$ and Y have the meaning mentioned,
are included under formula (III).

The antion, derived from an acid of pentavalent phosphorus, for the conducting salt may, for example, be phosphate, hydrogen phosphate, dihydrogen phosphate, methyl phosphonate, ethyl phosphonate, propyl phosphonate, butyl phosphonate, phenyl phosphonate, benzyl phosphonate, p-chlorobenzene phosphonate, methyl phosphonate methyl ester, methyl phosphonate ethyl ester, ethyl phosphonate ethyl ester, propyl phosphonate methyl ester, phenyl phosphonate methyl ester, benzyl phosphonate methyl ester, benzyl phosphonate methyl ester, p-chlorobenzene phosphonate methyl ester, methyl ester phosphate, ethyl ester phosphate, propyl ester phosphate, phenyl ester phosphate, benzyl ester phosphate, dimethyl ester phosphate, diethyl ester phosphate, methyl ethyl ester phosphate, dipropyl ester phosphate, diphenyl ester phosphate, dibenzyl ester phosphate, phenyl methyl ester phosphate, di-(p-toluyl) ester phosphate, di-(p-chlorobenzene) ester phosphate.

The preferred anions of an acid of pentavalent phosphorus are derived from diesterified phosphoric acid or from monoesterified phosphonic acid, such as for example diphenyl ester phosphate, di-(p-toluyl) ester phosphate, di-(p-chlorobenzene ester) phosphate, dimethyl ester phosphate, diethyl ester phosphate, methyl phosphonate methyl ester, methyl phosphonate ethyl ester, ethyl phosphonate ethyl ester, phenyl phosphonate methyl ester, p-chlorophenyl phosphonate methyl ester.

Preferred conducting salts for the process according to the invention are tetraalkyl ammonium salts of the formula $$R^7\text{—}B\text{—}O\text{—}N(alkyl)_4 \qquad (VI)$$

in which
B represents

$R^7$ denotes methyl, ethyl, methoxy, ethoxy or phenyl optionally substituted by alkyl and/or halogen and
$R^8$ represents methoxy or ethoxy.
Conducting salts of the formula $$R^7-B'-O-N(alkyl)_4 \qquad (VII),$$

in which
$R^7$ has the meaning mentioned and
$B'$ represents $-SO_2-$
are included under formula (VI).
Furthermore conducting salts of the formula $$R^7-B''-O-N(alkyl)_4 \qquad (VIII),$$

in which
$B''$ represents

and
$R^7$ and $R^8$ have the meaning mentioned
are also included under formula (VI).
Preferred conducting salts which may be mentioned as examples are: tetramethyl ammonium benzene sulphonate, tetraethyl ammonium p-toluene sulphonate, tetrabutyl ammonium p-toluene sulphonate, trimethylbutyl ammonium o-chlorobenzene sulphonate, tetraethyl ammonium 2,4-dichlorobenzene sulphonate, dimethyl-dipropyl ammonium p-chlorobenzene sulphonate, tetramethyl ammonium 2,4-dichlorobenzene sulphonate, tetramethyl ammonium methyl ester sulphate, tetraethyl ammonium ethyl ester sulphate, tetramethyl ammonium dimethyl phosphate, tetraethyl ammonium diethyl phosphate, triethylmethyl ammonium dimethyl phosphate, tetramethyl ammonium methyl phosphonate methyl ester, tetramethyl ammonium ethyl phosphonate methyl ester.

The concentration of the conducting salt in the process according to the invention is for example 0.01 to 2 mols per liter, preferably 0.05 to 0.5 mols per liter.

The concentration of substituted toluene in the alcoholic solution may, in the process according to the invention, amount to 1% to 50% by weight, preferably 10% to 30% by weight.

The process according to the invention may be conducted in the temperature range of $-20°$ to $+60°$ C., preferably from $+10°$ to $+40°$ C.

The process according to the invention may be conducted in a conventional electrolysis apparatus known to those skilled in the art, using oxidation-resistant anodes, for example anodes consisting of graphite, lead, dioxide, a metal of the platinum group, an alloy of metals of the platinum group or using metals which have a coating of a platinum or platinized titanium.

Examples which may mention of the cathode material are copper, nickel, steel, platinum or graphite, preferably steel.

In the process according to the invention pure hydrogen is formed as the off-gas from the electrolysis, thus, apart from rinsing the apparatus with inert gas before putting it into operation no further measures are required to prevent oxy-hydrogen formation.

Optionally it may be appropriate to use a poorly oxidizable base in the process according to the invention, in order to prevent a lowering of the pH value to values below 7. For this purpose the following may be mentioned as examples: collidine or 2,6-lutidine in a quantity of 0.01% to 2% by weight, preferably 0.05% to 1% by weight relative to the total quantity of the electrolyte.

Current densities of 0.1 to 50 A/dm$^2$, preferably from 1 to 20 A/dm$^2$, may be selected in the process according to the invention.

The cell voltage adjusts itself as a function of the composition of the electrolyte, the temperature and the geometry of the individual cell. It may for example amount to values of 4 to 12 V per individual cell.

In the process according to the invention optionally substituted benzaldehyde dialkyl acetals of the formula

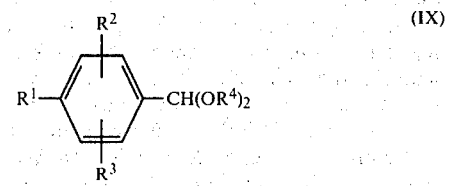

in which
$R^1$ to $R^4$ have the above-mentioned meaning, may be prepared, such as for example p-methoxy-benzaldehyde dimethyl acetal, p-methoxy-benzaldehyde diethyl acetal, p-methoxy-benzaldehyde dipropyl acetal, p-methoxybenzaldehyde dibutyl acetal, p-ethoxy-benzaldehyde dimethyl acetal, p-ethoxy-benzaldehyde diethyl acetal, p-propoxybenzaldehyde dimethyl acetal, p-butoxy-benzaldehyde dimethyl acetal, p-phenoxybenzaldehyde diisopropyl acetal, p-benzyloxy-benzaldehyde dimethyl acetal, p-benzyloxy-benzaldehyde diisobutyl acetal, 2-methyl-4-methoxy benzaldehyde dimethyl acetal, 3-methyl-4-methoxy-benzaldehyde diethyl acetal, 2,5-dimethyl-4-methoxy benzaldehyde dimethyl acetal, 2,6-dimethyl-4-phenoxy-benzaldehyde dimethyl acetal, 2-methyl-4-methoxy-5-phenyl-benzaldehyde dimethyl acetal, 2-benzyl-4-phenoxy-5-isopropyl-benzaldehyde diethyl acetal, 2-ethyl-3-benzyl-4-methoxy-benzaldehyde dimethyl acetal, benzaldehyde dimethyl acetal, 2-methyl-benzaldehyde dimethyl acetal, 3-methyl-benzaldehyde dimethyl acetal, 4-methyl-benzaldehyde dimethyl acetal, 3,5-dimethyl-benzaldehyde dimethyl acetal, 4-ethyl-benzaldehyde dimethyl acetal, 4-(n-propyl)-benzaldehyde dimethyl acetal, 4-(n-butyl)-benzaldehyde dimethyl acetal, 4-(i-butyl)-benzaldehyde dimethyl acetal, 4-(t-butyl)-benzaldehyde dimethyl acetal, 4-phenyl-benzaldehyde dimethyl acetal, 4-(4'-methyl)-biphenylaldehyde dimethyl acetal, 4-(4'-methoxy)-biphenylaldehyde dimethyl acetal, 4-benzylbenzaldehyde dimethyl acetal.

In the process according to the invention secondary products occur which are of the type of an optionally substituted benzyl ether of the formula

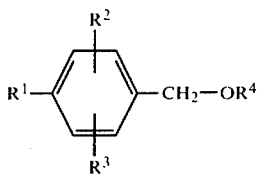

(X)

wherein $R^1$, $R^2$, $R^3$ and $R^4$ have the above mentioned meaning and which affect the yield of the desired main product. These secondary products can be isolated from the reaction mixture of the electrochemical oxidation, for example by means of distillation. These secondary products can be reintroduced into the starting product for the electro-chemical oxidation. To achieve this, in separating the reaction mixture any starting material which might be still present, the secondary products and the desired process product may be collected separately. Then the secondary products, as well as the starting product, may be reintroduced into the electrochemical oxidation. It is however, also possible, during the separation of the reaction mixture, to collect just one single fraction apart from the process product, for example by means of distillation, this fraction containing the secondary products, the unchanged starting material and some of the end product. This fraction can then be introduced into the starting material for the electro-chemical oxidation without further purification and without further separation into the individual components. This latter process variant is preferred.

The named secondary products may contain components which, when merely introducing them into the starting material for the electro-chemical oxidation do not, without further treatment, contribute to an increase in the yield, but which after having undergone appropriate pretreatment prior to reintroduction into the starting material, contribute to an increase in yield. Such components can be of the type of an optionally substituted 1,4-cyclohexadiene of the formula

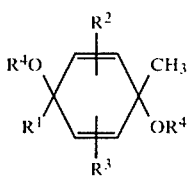

(XI)

wherein $R^1$, $R^2$, $R^3$ and $R^4$ have the above mentioned meaning. Such components can for example occur when toluenes of formula (I) are used, in which the substituent $R^1$ denotes hydrogen, alkyl, aralkyl or aryl, and when conducting salt is used which is derived from an acid of pentavalent phosphorus. Treatment with catalytically activated hydrogen may for example be mentioned as being appropriate treatment of these components of the secondary products.

If such secondary product components occur which require treatment prior to reintroduction, the following variants of the process according to the invention may for example be used:

(a) If the proportion of secondary products which, following treatment by hydrogenation, contribute to an increase in yield, is very small compared with the secondary products already described above, hydrogenation may be omitted and the total quantity of secondary products can be directly reintroduced into the starting material for the electro-chemical oxidation. In order to avoid an increase in secondary product components which would necessitate hydrogenation it may be recommendable to sluice out a portion of the secondary product mixture prior to reintroduction into the starting material and to destroy this in an appropriate manner.

(b) In a further process variant one can separate the secondary product mixture into its components, for example by distillation and reintroduce the individual components of the secondary product mixture separately into the starting material. In this, the secondary product components which have been found to contribute to an increase in yield without being treated with hydrogenation, can be reintroduced directly into the starting mixture, whereas those secondary product components which have been found to contribute to an increase in yield only after having been pretreated with hydrogenation are subjected to such hydrogenation pretreatment.

(c) In a further variant of the process according to the invention in the separation of the reaction mixture, for example by distillation of the reaction mixture from the electrochemical reaction as described above, only one single batch of first runnings is removed prior to the main product. These first runnings then contain a small quantity of the non-converted starting material, all the secondary product components and possibly some of the desired main product. The whole of the first runnings is then subjected to the hydrogenating treatment and thereafter reintroduced into the starting material for the electro-chemical oxidation. Surprisingly, all components of the said first runnings which need no hydrogenating pretreatment before reintroducing them into the starting material of the electro-chemical oxidation, are not affected by the hydrogenating treatment. This last variant is preferred since it is conducted easily.

The hydrogenating treatment of the secondary products, both individually and mixed with some of the starting material and some of the main product, as described, is conducted by treatment with hydrogen in the presence of a hydrogenation catalyst, in an alcohol as solvent at a temperature of approximately 0° C. to the boiling point of the alcohol under normal or under elevated pressure.

Hydrogenation catalysts which may be used are the conventional hydrogenation catalysts known to those skilled in the art. Those which may for example be mentioned are: noble metal catalysts, such as finely divided platinum or palladium; noble metal oxide catalysts, which are only reduced by the hydrogenating hydrogen when in a hydrogenation mixture; Raney catalysts, such as Raney nickel, Raney nickel/iron, Raney nickel/copper, Raney nickel/cobalt, oxide or sulphide catalysts, such as copper chromium oxide, zinc chromium oxide, molybdenum sulphide or tungsten sulphide. The catalysts may be used with or without a carrier. As carrier carbon, silicon dioxide, aluminium oxide, alkaline earth sulphates, alkaline earth oxides and alkaline earth carbonates may for example be mentioned.

Examples which may particularly be mentioned of hydrogenation catalysts are the noble metal catalysts, for example platinum or palladium, optionally on a carrier material. The particularly preferred hydrogenation catalyst is palladium on magnesium oxide/kieselguhr.

The hydrogenation of the secondary products, according to the invention, is conducted in the solution of a lower alcohol, such as methanol, ethanol, propanol or butanol. The secondary products treated by means of hydrogenation may then be separated, for example by distillation, from the alcohol used in the hydrogenation. Preferably, however, the same alcohol $R^4OH$ of the formula (II) is used for the hydrogenation as that used for conducting the electrochemical oxidation of the process according to the invention. The secondary products treated by hydrogenation can then, preferably in the form of their solution in the alcohol $R^4OH$ (II) be reintroduced into the electrochemical oxidation.

The temperature which may be mentioned for conducting the hydrogenation is one of approximately 0° C. to the boiling point of the alcohol used as solvent. A temperature of approximately 15° to 40° C. is preferred.

The hydrogenation, according to the invention, of the secondary products can be conducted under normal pressure or under elevated pressure. An elevated temperature is for example a pressure of up to 200 bars. In a preferred variant the hydrogen formed cathodically during the electrolysis is used for the hydrogenation of the secondary products. This preferred variant is preferably conducted under normal pressure.

The process according to the invention of the electrochemical oxidation can be conducted both discontinuously and continuously. When using the continuous method of procedure the whole reaction mixture which leaves the electrolysis apparatus can, for example, be worked up continuously, the fraction containing the secondary products, being reintroduced, optionally after being treated with catalytically activated hydrogen, into the starting material for the electro-chemical reaction. In the continuous method of procedure, however, the electrolysis mixture can also be passed in circuit through the electrolysis apparatus, only a part of the reaction mixture being removed from behind the electrolysis apparatus and being worked up and the fraction containing the secondary products, optionally following treatment with catalytically activated hydrogen, being reintroduced prior to the electrolysis apparatus into the starting material introduced into this for the electro-chemical oxidation. The starting material in this method of procedure comprises, apart from the fraction with the secondary products reintroduced according to the invention, the optionally substituted toluene according to the extent to which it is consumed, the alcohol used as solvent and the conducting salt. The alcohol and the conducting salt, can be, at least partially, the alcohol and the conducting salt which are obtained during the working up of one part of the reaction mixture.

The process according to the invention can also be conducted in successively arranged electrolysis cells in the form of a cascade.

Furthermore, it has been found that by a decrease in the current density of the electrodes the selectivity of the process according to the invention can be increased. In order to combine the high time space yield associated with a high current density and the high selectivity obtained with a low current density, in a further variant of the process according to the invention, the current density can be decreased over the course of the electrochemical oxidation. In the cascade arrangement of several electrolysis cells the current density in the first electrolysis cell can be at its highest and can be lowered slightly in each successive cell.

The process according to the invention can be explained by the following equation, using the example of the conversion of p-methoxyl toluene (P-methyl anisol) in methanolic solution to form p-methoxy-benzaldehyde dimethyl acetal (anisaldehyde dimethyl acetal):

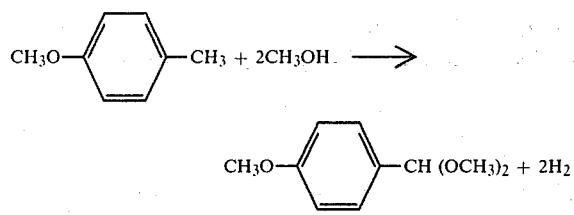

The process according to the invention ca, for example, be conducted as follows:

The electrolyte is produced by dissolving the optionally substituted toluene and the conducting salt in the desired alcohol. Optionally it may be advantageous to protect the acid-sensitive acetals by the addition, known per se, of an oxidation-resistant base, such as for example collidine or lutidine. The electrolyte is electrolysed up to the desired reaction level, for example 60% to 90% of the theoretical reaction level, optionally while decreasing the current density in the course of the electro-chemical reaction. Following the electrolysis the excess alcohol is distilled off and the conducting salt precipitated in crystalline form is filtered off. The optionally substituted benzaldehyde dialkyl acetal can be obtained from the reaction mixture by conventional working up methods, for example by distillation. The secondary products of the electrochemical oxidation are, when separating the desired end product, generally obtained in the runnings prior to the end product, by separation by means of distillation. These runnings which contain non-reacted starting product, the secondary products and some of the end product, are then preferably without being separated out any further and optionally after a hydrogenating treatment reintroduced into the starting material for the electro-chemical reaction.

If the process according to the invention is conducted continuously the electrolyte is pumped through the electrolysis apparatus. After leaving the electrolysis apparatus the reaction mixture is completely or partially separated out by means of distillation into first runnings and the benzaldehyde dialkyl acetal formed. The first runnings are then reintroduced into the starting material for the electro-chemical oxidation, hydrogenating treatment optionally being conducted beforehand. The toluene of formula (I) as starting product is supplemented in the electrolyte according to the extent to which it is consumed. If in the case of the continuous reaction procedure only one portion of the reaction mixture is removed after leaving the electrolysis apparatus the remaining reaction mixture is recycled and supplemented by the first runnings or the first runnings containing the secondary products and having been subjected to hydrogenating treatment, as well as by toluene as a starting compound according to the extent to which it is consumed.

Benzaldehyde dialkyl acetals of formula (IX) are valuable intermediate products and can, for example in the presence of diluted acids, be hydrolysed to form the corresponding benzaldehydes. Substituted benzaldehydes are for example valuable odorant components (Ullmann's Enzyklopädie der technischen Chemie, 3rd edition, volume 14, page 738, Urban and Schwarzenberg, Munich/Berlin, 1968). If further processing of the benzaldehyde dialkyl acetals to form optionally substituted benzaldehydes is considered the working up of the electrolyte can optionally also be conducted by isolating the free substituted benzaldehyde and not the substituted benzaldehyde dialkyl acetal, the former being able to be obtained, as is known, by acid hydrolysis.

To achieve this the appropriate procedure is as follows: after the oxidation has ended the electrolyte is tested for its contents of substituted benzaldehyde dialkyl acetal and an amount of water equivalent to this is added. Using an acidic ion exchanger or by adding an acid, for example p-toluene sulphonic acid the corresponding aldehyde is then isolated from the benzaldehyde dialkyl acetal by hydrolysis. The hydrolysis mixture is then filtered off from the acid catalyst or the added acid is neutralised and the mixture is worked up by distilling off the methanol, filtering off the conducting salt and working up the remaining mixture, for example by distillation, to produce the desired benzaldehyde.

In the process according to the invention the benzaldehyde dialkyl acetals of formula (IX) can be produced in a technically progressive way by one-step electrochemical oxidation, with high selectivity and high purity. By means of the reintroduction of the secondary products, according to the invention, optionally after being treated with hydrogenation, high material and current yields are achieved.

It is extremely surprising that under the conditions of the process according to the invention the aromatic nucleus of the toluenes employed is not substituted by the alkoxy group of the alcohol used and that further oxidation to form substituted benzoic acid ortho ester is not observed, as was expected according to the prior art (J. Am. Chem. Soc. 85, 252 (2963). Furthermore, it is susprising that the oxidative dimerization of aromatic compounds containing side-chains, which has been observed especially in the case of graphite anodes (Fritz Beck, Elektroorganische Chemie (Electroorganic Chemistry), page 242 and 249, Verlag Chemie Publishers, Weinheim 1974) is almost completely suppressed. It is als surprising that, apart from optionally substituted toluenes which have an ester group in the para position to the methyl group, those which carry a hydrogen atom or an alkyl, aryl or aralkyl group in the para position to the methyl group are also able to be oxidized electrochemically to form the corresponding benzaldehyde dialkyl acetals, since the known, considerably higher half-wave potential of the last mentioned compounds compared with compounds which carry an ether group in the para position to the methyl group, led one to expect marked occurence of secondary reaction, for example the electrochemical oxidation of the alcohol employed. Thus, for example, the half-wave potential of toluene is 1.9 volt. compared with 1.2 volt. for p-methoxy toluene (Tetrahedron Letters, 1978, page 3725).

EXAMPLE 1

20 mg (164 mmol) p-methoxy toluene, dissolved in 70 ml methanol containing 1 ml collidine and 5 g tetraethyl ammonium p-toluene sulphonate in dissolved form, are electrolysed using a graphite anode at a current density of 10 A/dm$^2$ and a temperature of 25° C. until 0.6 F are consumed. The electrolyte is concentrated under a water pump vacuum, the residue is distilled and 23 g crude product are obtained with a boiling range of 70°–120° C. and containing, according to gas chromatographical analysis, 81.5% = 18.7 g = 103 mmol anisaldehyde dimethyl acetyl and some starting and secondary product which is reintroduced into the electrochemical oxidation. A substance yield of 67% is calculated from this and a current yield of 71%, based on the theoretical yields.

EXAMPLE 2

A solution of 29.6 g (0.2 mol) p-(t-butyl-toluene in an electrolyte consisting of 75 ml methanol, 3 g tetraethyl ammonium p-methylbenzene sulphonate and 2 ml collidine is oxidized using a graphite anode at a current density of 8 A/dm$^2$ and a temperature of 25° C. until 0.6 F have been consumed. The methanol is distilled off, the precipitated conducting salt is filtered off and 30.5 g product mixture are isolated by distillation and separated out by fractional distillation. By means of this first runnings are obtained which contain collidine, starting product and the secondary products, these first runnings being obtained prior to the p-(t-butyl)-benzaldehyde dimethyl acetal. The first runnings are reintroduced into the electrochemical oxidation. From this yield of 55% of the theoretical yield of p-(t-butyl)-benzaldehyde dimethyl acetal, b.p.0.1:65° C. is obtained.

EXAMPLE 3

21.2 g (0.2 mol) p-xylene, dissolved in an electrolyte of 70 ml methanol, 5 g tetraethyl ammonium p-methylbenzene sulphonate and 0.5 ml collidine are electrolyzed using a graphite anode at a temperature of 25° C. and a current density of 10 A/dm$^2$ until 0.7 F are consumed. The methanol is distilled off, the conducting salt is filtered off, 24 g product mixture of b.p.$_{0.1}$:34° to 44° C. are isolated by distillation and separated out by distillation according to Example 2. The first runnings of this distillation are reintroduced into the electrochemical oxidation. From this a yield of 64% of the theoretical yield of p-methyl-benzaldehyde dimethyl acetal of b.p.$_{20}$:94° C. is obtained.

EXAMPLE 4

29.6 g p-(t-butyl) toluene, dissolved in an electrolyte of 75 ml methanol and 5 g tetraethyl ammonium methyl sulphate and 1 ml collidine, are electrolysed at 25° C. and a current density of 10 A/dm$^2$ using a graphite anode until 0.67 F are consumed. After distilling off the methanol 5 g precipitated conducting salt are filtered off and 33.3 g filtrate are obtained which are separated out by distillation. First runnings are obtained which are reintroduced, without further treatment, together with further starting materials into the electrolysis, and also 16 g p-(t-butyl)-benzaldehyde dimethyl acetal, b.p.$_{0.1}$: 65° C. Taking into account the reintroduction of the first runnings a substance yield of 63% of the theoretical yield are obtained.

EXAMPLE 5

A solution of 740 g (5 mol) p-(t-butyl) toluene in an electrolyte consisting of 2000 g methanol and 130 g tetramethyl ammonium dimethyl phosphate, is electrolysed in an electrolysis cell with bipolar graphite electrodes at a current density of 8 A/dm$^2$ and a temperature of 25° C. until 16 F are consumed.

The methanol is distilled off, the precipitated conducting salt is filtered off and first runnings of 581 g and a product fraction K$_{p0.1\ mbar}$: 65° C. of 271 g of (1.3 mol)

p-(t-butyl)-benzaldehyde dimethyl acetal are isolated. A residue of 47 g remains.

The first runnings are hydrogenated using a Pd catalyst in 30% methanol solution at normal pressure and room temperature and added to the starting material of a following electrolysis. Taking into account the reintroduction of the first runnings a yield of 92% of the theoretical yield of p-(t-butyl)-benzaldehyde dimethyl acetal is obtained.

EXAMPLE 6

A solution of 610 g (5 mol) p-methoxy toluene dissolved in 1800 g methanol containing 100 g tetramethyl ammonium dimethyl phosphate is electrolysed as in Example 5 until 16 F are consumed. First runnings of 237 g and 597 g anisaldehyde dimethyl acetal ($K_{p15 \, mbar}$:123° C. are obtained. The first runnings are added to the starting material of the next electrolysis. Taking into account this reintroduction a yield of 95% anisaldehyde dimethyl acetal is calculated.

What is claimed is:

1. A process for the preparation of optionally substituted benzaldehyde dialkyl acetal which comprises subjecting a toluene of the formula

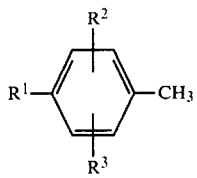

wherein
$R^1$ denotes hydrogen, alkyl, aryl, aralkyl, alkoxy, aryloxy or aralkoxy and
$R^2$ and $R^3$ which can be the same or different represent hydrogen, alkyl, aryl or aralkyl, dissolved in an alcohol of the formula

wherein
$R^4$ denotes alkyl in the presence of a conducting salt of the formula

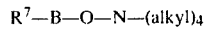

in which
B represents

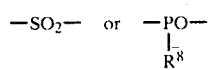

$R^7$ denotes methyl, ethyl, methoxy, ethoxy or phenyl optionally substituted by alkyl and/or halogen and $R^8$ represents methoxy or ethoxy
to an electrochemical oxidation employing a current density of 0.1 to 50 A/dm² employing an oxidation-resistant anode.

2. A process according to claim 1 wherein the reaction product from the electrochemical oxidation is separated and the secondary products comprising intermediates and by-products are admixed with starting material and recycled to the electrochemical oxidation.

3. A process according to claim 2 wherein at least some of the secondary products separated from the product of the electrochemical oxidation are treated with hydrogen in the presence of a catalyst before being recycled to the electrochemical oxidation.

4. A process according to claim 3 wherein the treatment of the secondary products with hydrogen in the presence of a catalyst is effected in the co-presence of an alcohol of the formula $R^4OH$ in which at least some of said secondary products are dissolved, said treatment being effected at a temperature of between 0° C. and the boiling point of the alcohol of the formula $R^4OH$ at normal or elevated pressure, the product of the hydrogenation thereafter being recycled to the electrochemical oxidation.

5. A process according to claim 4 wherein the same alcohol employed as the solvent for the toluene in the electrochemical oxidation is employed as the solvent for the secondary products during their treatment with hydrogen in the presence of a catalyst.

6. A process according to claim 2 wherein the product of the electrochemical oxidation is separated by distillation and during the distillative separation only one fraction is collected in addition to the desired reaction product, this fraction containing, apart from the secondary product, unchanged toluene reactant and some of the desired reaction product, this one fraction being recycled unchanged into an electrochemical oxidation.

7. A process according to claim 2 which is carried out continuously, by passing the components to undergo electrochemical oxidation through the reaction zone defined by the electrodes, removing the reaction mixture and distillatively separating the reaction mixture to recover a fraction containing secondary products comprising byproducts and intermediates and recycling said fraction to the electrochemical oxidation zone.

8. A process according to claim 7 wherein the secondary products are treated with hydrogen in the presence of a hydrogenation catalyst before being recycled to the electrochemical oxidation zone.

9. A process according to claim 3 wherein the hydrogen employed for the catalytic hydrogenation is hydrogen produced during the electrochemical oxidation.

10. A process according to claim 1 wherein the current density is decreased during the course of the electrochemical oxidation.

11. A process according to claim 1, wherein the process is carried out using an electrolysis cell containing a graphite anode.

* * * * *